(12) United States Patent  
DiDonato

(10) Patent No.: US 11,804,903 B2  
(45) Date of Patent: *Oct. 31, 2023

(54) CONTROL SIGNAL REPEATER SYSTEM

(71) Applicant: Sonos, Inc., Santa Barbara, CA (US)

(72) Inventor: Alex DiDonato, Belmont, MA (US)

(73) Assignee: Sonos, Inc., Santa Barbara, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/135,082

(22) Filed: Dec. 28, 2020

(65) Prior Publication Data

US 2021/0119704 A1  Apr. 22, 2021

Related U.S. Application Data

(63) Continuation of application No. 16/422,312, filed on May 24, 2019, now Pat. No. 10,880,009.

(51) Int. Cl.
*H04B 10/29* (2013.01)
*H04B 10/60* (2013.01)
*G06F 3/16* (2006.01)

(52) U.S. Cl.
CPC ............ *H04B 10/29* (2013.01); *H04B 10/60* (2013.01); *G06F 3/16* (2013.01)

(58) Field of Classification Search
CPC ........ H04B 10/29; H04B 10/60; H04B 10/40; H04B 10/50; H04B 10/116; H04B 10/1149; H04B 10/502; H04B 10/11; H04B 10/1123; H04B 10/298; H04B 10/291; H04B 10/2914; H04B 10/297; H04B 10/118; G06F 3/16
USPC ....... 398/173, 118, 130, 128, 135, 138, 140, 398/106, 107

See application file for complete search history.

(56) References Cited

U.S. PATENT DOCUMENTS

| 7,023,498 B2* | 4/2006 | Ishihara | G08C 23/04 |
| | | | 704/E15.045 |
| 8,134,649 B2* | 3/2012 | Rogers | H04N 21/42221 |
| | | | 348/706 |
| 2018/0263450 A1* | 9/2018 | Kim | G05D 1/0033 |
| 2019/0101358 A1* | 4/2019 | Faecher | F41A 21/32 |

* cited by examiner

*Primary Examiner* — Hibret A Woldekidan

(57) ABSTRACT

An example playback device includes a housing having a front side, a back side, a first end, and a second end. The playback device also includes an IR receiver positioned on the front side of the housing, a first IR emitter positioned on the back side of the housing and oriented such that a first IR signal emitted from the first IR emitter is directed toward the second end of the housing, and a second IR emitter positioned on the back side of the housing and oriented such that a second IR signal emitted from the second IR emitter a) is directed toward the first end of the housing and b) crosses the first IR signal emitted from the first IR emitter. The first and second IR emitters are communicatively coupled to the IR receiver within the housing and configured to retransmit an IR control signal received by the IR receiver.

20 Claims, 6 Drawing Sheets

CONTROL SIGNAL REPEATER SYSTEM

CROSS-REFERENCE TO RELATED APPLICATIONS

This application claims the benefit of priority under 35 U.S.C. § 120 to U.S. application Ser. No. 16/422,312 filed May 24, 2019, entitled "Control Signal Repeater System," the contents of which are incorporated by reference herein in their entirety.

FIELD OF THE DISCLOSURE

The present disclosure is related to consumer goods and, more particularly, to systems, products, features, services, methods, and other elements directed to entertainment systems or some aspect thereof.

BACKGROUND

Current entertainment systems, such as home theater systems, often include multiple components that can operate in various combinations. For instance, a television or similar display may play back video content while one or more externally connected speakers plays back audio content, possibly via multiple audio channels. A system's audio and video sources may be numerous, and may be associated with further components such as a cable box, a game console, and the like. Remote control of the components in such systems frequently utilizes a line of sight based control signal, such as an infrared (IR) signal emitted from a remote device. In some systems, a given component may be obscured due to the arrangement of the system or the layout of associated furniture, for example. In such cases, a repeater system may be used to relay a control signal to an otherwise obscured component.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1:
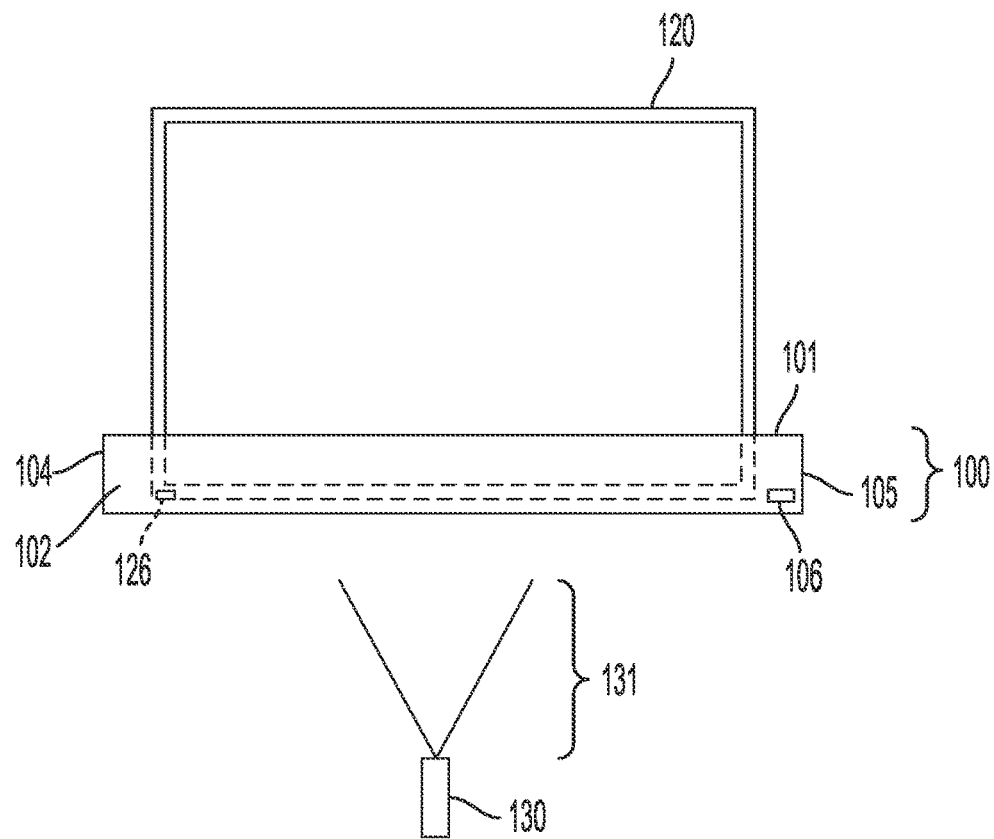
FIG. 1 is a front view of a playback device in an entertainment system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to a control signal repeater system implemented as part of a playback device. The control signal repeater system may be more compact and efficient than some current systems. For example, in some entertainment systems, a multi-channel soundbar may be positioned in front of a connected display, both of which may sit atop an entertainment stand or similar piece of furniture. Such displays generally include an infrared (IR) receiver positioned on the front of the display to receive control signals from an associated remote control. Frequently, the IR receiver is located along the bottom bezel, near the stand/feet of the display. However, this location may be obscured by the example soundbar discussed above, particularly if the soundbar is comparable in width to the display.

For this reason, in some current soundbars, an IR repeater system is incorporated into the soundbar to relay control signals intended for the display. For instance, the soundbar may include an IR receiver on its front side and a number of IR emitters on its back side, such that control signals intended for the display can be received and then relayed to the display. However, because the location of a display's IR receiver varies based on the model and size of the display, the IR repeater systems of current soundbars must be designed with a great deal of redundancy. For example, some current soundbars include a line array of ten or more IR emitters along the length of their back side, to account for the numerous possible locations of a display's IR receiver.

However, this arrangement requires hardware space within the housing of the soundbar, both internally for the wiring associated with the numerous IR emitters, as well as externally, as a lengthy window or similar opening (or numerous small ones) must be formed in the back side of the housing for the array of emitters. These hardware requirements may constrain the physical design of the soundbar, which might otherwise utilize the same space for other hardware, such as some associated with the soundbar's audio drivers. Further, the array of emitters may have a power requirement that is proportional to the number of emitters in the array.

For these and other reasons, it may be desirable to implement a control signal repeater system within a playback device, such as a soundbar, that is more compact in its design, using fewer IR emitters in an arrangement that may provide coverage that is functionally comparable to the line array arrangement described above. For example, two IR emitters may be positioned on the back side of a playback device, directed in a cross-firing arrangement such they are each pointed substantially toward the opposite end of the playback device.

In some embodiments, the two IR emitters may be positioned in a relatively central location on the back side of the playback device. This location may include an indentation or similar delineation in the housing of the playback device where other ports for the device are also positioned, such as audio/video, communication (e.g., ethernet), and/or power connections. By consolidating the IR emitters in this location with other input/output hardware, this may allow for the playback device's internal and external design to be more dedicated to audio reproduction and/or aesthetic design considerations. Further, the fewer IR emitters will require less power for each received and retransmitted control signal that the playback device handles.

Accordingly, in some embodiments a playback device is provided. The playback device includes a housing including a front side, a back side, a first end, and a second end. The playback device also includes an IR receiver positioned on the front side of the housing, a first IR emitter positioned on the back side of the housing and oriented such that a first IR signal emitted from the first IR emitter is directed toward the second end of the housing, and a second IR emitter positioned on the back side of the housing and oriented such that a second IR signal emitted from the second IR emitter a) is directed toward the first end of the housing and b) crosses the first IR signal emitted from the first IR emitter. The first IR emitter and the second IR emitter are each communicatively coupled to the IR receiver within the housing such that the first IR emitter and the second IR emitter are configured to retransmit an IR control signal received by the IR receiver.

In another aspect, a method of repeating an IR signal is provided. The method includes receiving, via an IR receiver positioned on a front side of a housing of a playback device, an IR control signal, where the housing further comprises a back side, a first end, and a second end. The method also includes retransmitting the IR control signal via a first IR emitter communicatively coupled to the IR receiver within the housing, where the first IR emitter is positioned on the back side of the housing and oriented such that a first IR signal emitted from the first IR emitter is directed toward the second end of the housing. The method also includes retransmitting the IR control signal via a second IR emitter communicatively coupled to the IR receiver within the housing, where the second IR emitter is positioned on the back side of the housing and oriented such that a second IR signal emitted from the second IR emitter a) is directed toward the first end of the housing and b) crosses the first IR signal emitted from the first IR emitter.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. Many of the details, dimensions, angles and other features shown in the Figures are merely illustrative of particular embodiments of the disclosed technology, and are not necessarily drawn to scale. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Example Control Signal Repeater Systems and Operation

Referring now to the Figures, FIG. 1 illustrates a front view of a playback device 100 in an example entertainment system. The entertainment system includes a display 120 and a control device 130 for controlling aspects of the entertainment system. For example, the control device 130 may emit a control signal 131, such as an infrared (IR) control signal that requires line of sight to the receiving device. Although IR control signals are among the most commonly used control signals in current devices and are referred to throughout this specification, other types of control signals are also possible, including light-based control signals having a wavelength different from an IR signal, for instance.

Figure 2:
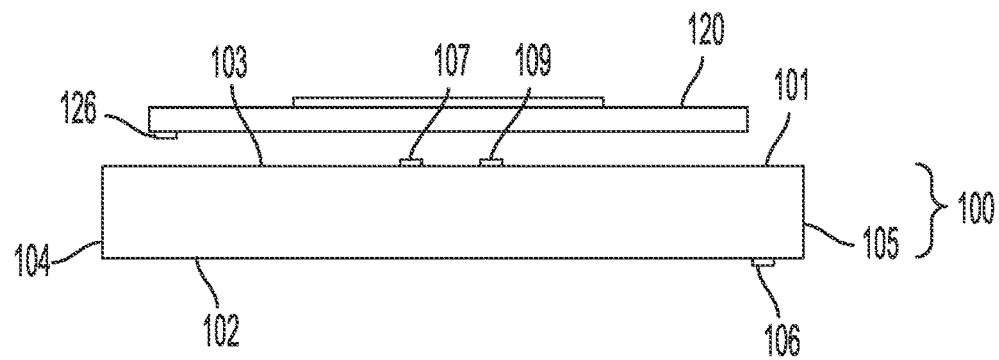
FIG. 2 is a top view of the playback device of FIG. 1, according to an example implementation.

The playback device 100 includes a housing 101 having a front side 102 and a back side 103, which can be seen more clearly in the top view of FIG. 2. The housing 101 also includes a first end 104 and a second end 105 opposite the first end 104. In the examples shown in the Figures, the playback device 100 takes the form of a soundbar having a width that is greater than that of the display 120. However, playback devices and displays of other shapes and sizes are also contemplated.

The playback device 100 also includes an IR receiver 106 positioned on the front side 102 of the housing 101, located near the second end 105, although other locations are also possible. The IR receiver 106 may be implemented using, for example, one or more photodiodes. In some examples, the IR receiver 106 may be located within the front side 102 of the housing 101, and a window or similar opening in the front side 102 of the housing 101 may expose the IR receiver 106 to the control signal 131. For instance, the housing 101 may include a window formed from an IR-transparent material that allows the control signal 131 to reach the IR receiver 106. Other arrangements are also possible.

As shown in FIG. 1, the playback device 100 may be situated in the entertainment system such that it physically blocks the line of sight to an IR receiver of the display 120. For example, the IR receiver 126 of the display 120 may be located along the bottom edge of the display 120, which is obscured by the playback device 100 and is shown by dashed lines in FIG. 1.

FIG. 2 is a top view of the playback device 100 and display 120 shown in FIG. 1. In FIG. 2, the IR receiver 126 of the display 120 can be seen. For ease of illustration in FIG. 2, the IR receiver 106 of the playback device 100 and the IR receiver 126 of the display 120 are shown as protruding from the playback device 100 and display 120, respectively. However, as discussed above, the IR receiver 106 may be positioned behind a window formed in the front side 102 of the housing 101, or may be otherwise substantially flush with the front side 102 of the housing 101. The same is true for the IR receiver 126 of the display 120.

In some implementations, the IR receiver 106 may be located further within the playback device 100, within the housing 101, to reduce the design constraints on the housing 101. In such cases, the playback device 100 may include a waveguide or similar structure to guide the IR control signal transmitted from the control device through an existing opening in the housing 101 to the location of the IR receiver 106. For example, a waveguide may be positioned behind a perforated grill associated with one or more of the audio drivers of the playback device 100. In this way, the IR control signal 131 from the control device 130 may pass through the openings in the grill and into the waveguide, where they may be guided to the IR receiver within the housing 101. Other similar arrangements are also possible.

FIG. 2 also illustrates a first IR emitter 107 and a second IR emitter 109, each positioned on the back side 103 of the housing 101. Similar to the IR receiver 106, the emitters are shown as protruding from the back side 103 of the housing 101 for ease of illustration in FIG. 2. However, they may alternatively be flush with the back side 103 of the housing 101, or positioned behind an opening or window in the back side 103 that is formed from IR-transparent material, as discussed above. In some implementations, the first IR emitter 107 and the second IR emitter 109 may be positioned within a recessed area on the back side 103 of the housing 101, as further discussed below.

Figure 3:
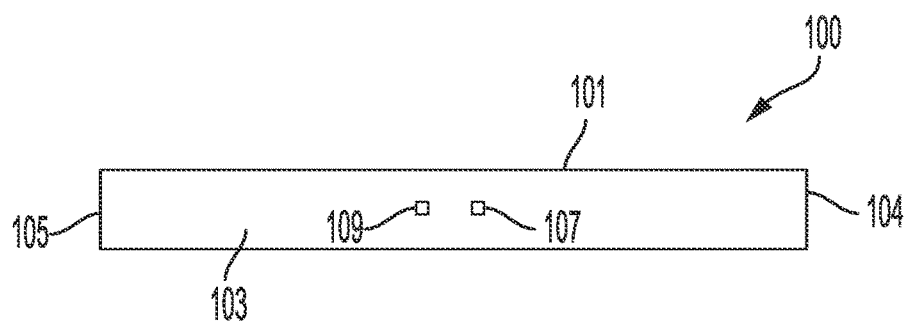
FIG. 3 is a rear view of the playback device of FIG. 1, according to an example implementation.

FIG. 3 is a rear view of the playback device 100 shown in FIGS. 1 and 2, showing the back side 103 of the playback device 100. As shown in FIG. 2, the first IR emitter 107 and second IR emitter 109 are both centrally located between the first end 104 and the second end 105 of the playback device 100, although other locations are also possible. Further, the first IR emitter 107 and the second IR emitter 109 are each communicatively coupled to the IR receiver 106 of the playback device 100 within the housing 101 such that the first IR emitter 107 and the second IR emitter 109 are configured to retransmit an IR control signal received by the IR receiver 106.

Figure 4:
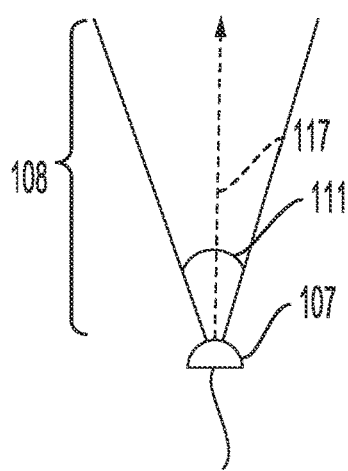
FIG. 4 is a schematic diagram of an IR emitter, according to an example embodiment.

Turning now to FIG. 4, a schematic diagram of the first IR emitter 107 is shown. The first IR emitter 107 may be, for example, a light-emitting diode (LED). Other types of emitters are also possible. As shown in FIG. 4, the first IR emitter 107 may have a focused emitting direction 117, which may generally represent the direction that the first IR emitter 107 is "pointing." Further, a first IR signal 108 that is emitted by the first IR emitter 107 will generally encompass a first emitting angle 111 centered about the focused emitting direction 117. The first emitting angle 111 may represent the angle at which the emitted light has one half of the intensity as light at zero degrees, i.e., light pointed in the focused emitting direction 117 of the first IR emitter 107.

The first emitting angle 111 may be based on the design of the first IR emitter 107. For example, the first IR emitter 107 may be surrounded by shielding and/or reflective surfaces that redirect and focus the emitted light in the focused emitting direction 117 to obtain a desired angle of half intensity. For instance, the first IR emitter 107 may have a first emitting angle 111 that is +/−25 degrees to either side of the focused emitting direction 117, or 50 degrees in total. Smaller, more focused emitting angles are also possible, as are greater angles that disperse the light more widely.

In some implementations, and with reference to FIG. 4 the first IR emitter 107 may have a constant emitting angle 111 in both the horizontal and vertical direction. Thus, the first IR signal 108 may be emitted from the first IR emitter 107 in an approximately conical shape. Alternatively, the emitting angle 111 might not be the same in the horizontal and vertical directions. For example, the first IR emitter 107 may have a wider emitting angle in the horizontal direction and a narrower emitting angle in the vertical direction. The wider angle in the horizontal direction may provide increased flexibility for positioning the playback device 100 in front of the display 120. Whereas, positional flexibility might not be as important in the vertical direction, and thus the narrower angle in the vertical plane may help to focus the distributed radiant intensity in the horizontal plane.

Figure 5:
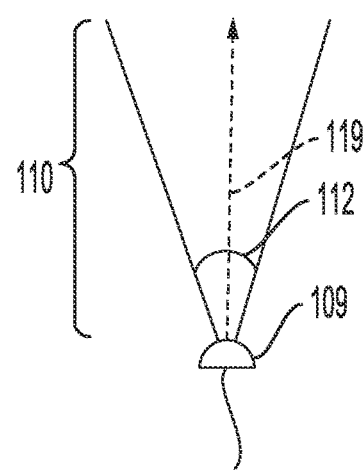
FIG. 5 is another schematic diagram of an IR emitter, according to an example embodiment.

FIG. 5 is a schematic diagram of the second IR emitter 109, which may be substantially the same as the first IR emitter 107. For example, the second IR emitter 109 may emit a second IR signal 110 that encompasses an emitting angle 112 centered around a focused emitting direction 119. Further, the emitting angle 112 of the second IR emitter 109 may differ in the horizontal and vertical directions, as discussed above.

Figure 6:
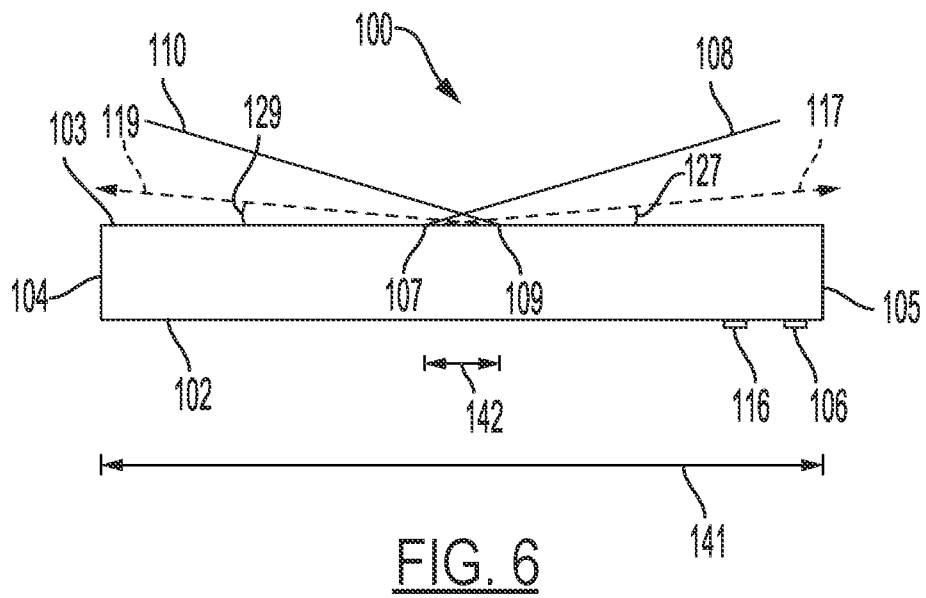
FIG. 6 is a top view of the playback device of FIG. 1, according to an example implementation.

FIG. 6 is a top view of the playback device 100 showing example orientations of the first and second IR emitters. For instance, the first IR emitter 107 may be oriented such that the first IR signal 108 emitted from the first IR emitter 107 is directed toward the second end 105 of the housing 101. Similarly, the second IR emitter 109 may be oriented such that the second IR signal 110 emitted from the second IR emitter 109 is directed toward the first end 104 of the housing 101. Further, the second IR emitter 109 is oriented such that the second IR signal 110 emitted from the second IR emitter 109 crosses the first IR signal 108 emitted from the first IR emitter 107.

As can be seen in FIG. 6, due to the shallow angle at which the IR emitters are oriented with respect to the back side 103 of the housing 101, approximately half of the first IR signal 108 and the second IR signal 110 may be directed into the housing 101. Nonetheless, this orientation provides the retransmitted IR control signal across a relatively wide area behind the playback device 100, using relatively few emitters. This may provide for increased flexibility in the mechanical design of the playback device 100, as it requires fewer openings in the housing 101 than some current solutions.

In some implementations, the first IR emitter 107 and the second IR emitter 109 may each be orientated such that the focused emitting direction of each emitter is substantially parallel to the back side 103 of the housing 101. For example, and with reference to FIG. 6, the focused emitting direction 117 of the first IR emitter 107 may have an angle of incline 127 that is five degrees or less from the back side 103 of the housing 101. Similarly, the focused emitting direction 119 of the second IR emitter 109 may also have an angle of incline 129 that is five degrees or less from the back side 103 of the housing 101. The focused emitting direction for both emitters with respect to the back side 103 of the housing 101, as well as their emitting angles, may be selected based on design considerations such as an anticipated distance from a connected display, the overall length of the playback device 100, the position of the emitters along the length of the playback device 100, and/or the relative position of the two emitters with respect to each other, among other factors.

For example, in some implementations, the playback device 100 may be relatively large such that a first distance 141 between the first end 104 and the second end 105 of the housing 101, as shown in FIG. 6, is greater than one meter. Additionally, a second distance 142 between the first IR emitter 107 and the second IR emitter 109 may be no greater than 15 centimeters, centered at the approximate midpoint on the back side 103 of the housing 101. Other dimensions are also possible.

In an alternative implementation, the two emitters may be positioned relatively near to one another on the back side 103 of the housing 101 as discussed above, however they might not be centered on the housing 101. Rather, they may be offset such that they are positioned closer to either the first end 104 or the second end 105. In this situation, and unlike the examples discussed above and shown in the Figures, the two emitters may be oriented at different angles with respect to the back side 103 of the housing 101. For instance, the emitter directed toward the more distant end of the playback device 100 may have a relative shallow angle of incline with respect the back side 103 of the housing 101, whereas the emitter directed toward the nearer end of the playback device 100 may have a greater angle of incline with respect the back side 103 of the housing 101. Additionally or alternatively, the two emitters may have different configurations in this case, with different emitting angles, for instance. Other variations are also possible.

In some embodiments, the playback device 100 may receive and relay IR control signals in additional or alternative ways. For example, the IR receiver 106 may be a first IR receiver that receives a first IR control signal that is retransmitted, as discussed above. The playback device 100 may also include a second IR receiver 116 positioned on the front side 102 of the housing 101 to receive a second IR control signal. Further, the playback device 100 may include processing for converting the second IR control signal received by the second IR receiver 116 to a non-IR control message.

For instance, the playback device 100 may include processing for converting an analog IR signal into a digital control message, such as a Consumer Electronics Control (CEC) control message. The non-IR control message may then be transmitted to a computing device that is connected to the playback device 100. In some examples, the connected computing device may be the display 120, or another component that is a part of the entertainment system such as a cable or satellite set-top box, DVR, DVD/Blu-ray, and/or game console. The control message may correspond to a command for browsing a menu on one of these components, for example. In this way, the playback device 100 may facilitate direct control of the display 120 and/or additional connected computing devices.

In some implementations, the playback device 100 may include processing for differentiating between the different types of IR control signals it might receive, and for determining how to handle them. For example, a given IR control signal may include, as part of the signal, a device code identifying the device for which the IR control signal is intended. The device code may identify, for instance, a specific manufacturer, and possibly model of the device, which may identify the type of device (e.g., a display, a DVR, etc.). The playback device 100 may have stored in memory a database of such device codes. In some examples, if the playback device 100 determines, based on the database, that a received IR control signal includes a device code that identifies a display, the playback device 100 may retransmit the IR control signal. Whereas, if the playback device 100 determines that the IR control signal includes a device code that identifies a component other than a display such as those identified above (which may be less likely to be positioned directly behind the playback device 100), the playback device 100 may convert the IR control signal into the non-IR control message, as discussed. Other solutions for selectively identifying and/or handling incoming IR signals are also possible.

Figure 7:
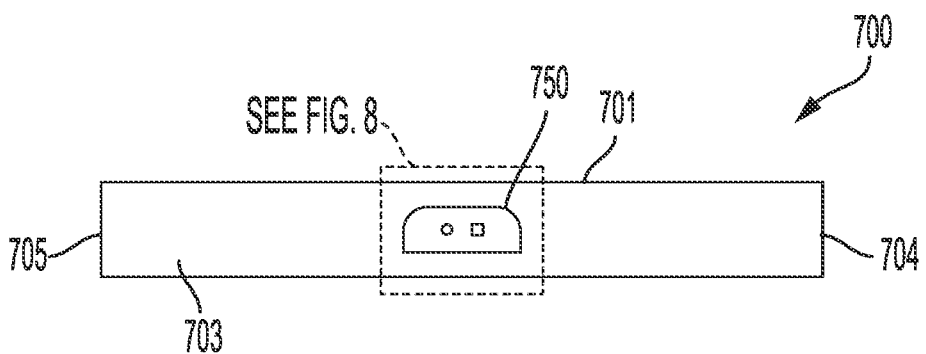
FIG. 7 is a rear view of an example playback device, according to an example implementation.

In some other cases, a control signal transmitted by the control device 130 may represent both the first IR control signal and the second IR control signal in the examples discussed above. For instance, the playback device 100 may both retransmit the IR control signal via the IR emitters and convert the IR control signal to a non-IR control message. In some situations, this may result in the targeted device (e.g., the display 120, a connected DVR, etc.) receiving both an IR control signal and a converted, non-IR control message, both representing the same command. In such cases, the targeted device may determine which signal to use. For instance, the display 120 may receive the retransmitted IR control signal from the playback device 100 first and execute commands accordingly. The display 120 may then disregard the non-IR control message received shortly thereafter, if it represents the same command that was just received. The display 120 or other targeted device may handle the incoming control signals in other ways as well. FIG. 7 shows a rear view of a playback device 700, according to another example implementation. Similar to the playback device 100 discussed above, the playback device 700 includes a housing 701 having a front side (not shown), a backside 703, a first end 704, and a second end 705. Further, back side 703 of the housing 701 includes an indentation 750. A first IR emitter 707 and a second IR emitter 709 may be positioned with in the indentation 750, which may be seen with reference to FIG. 8.

Figure 8:
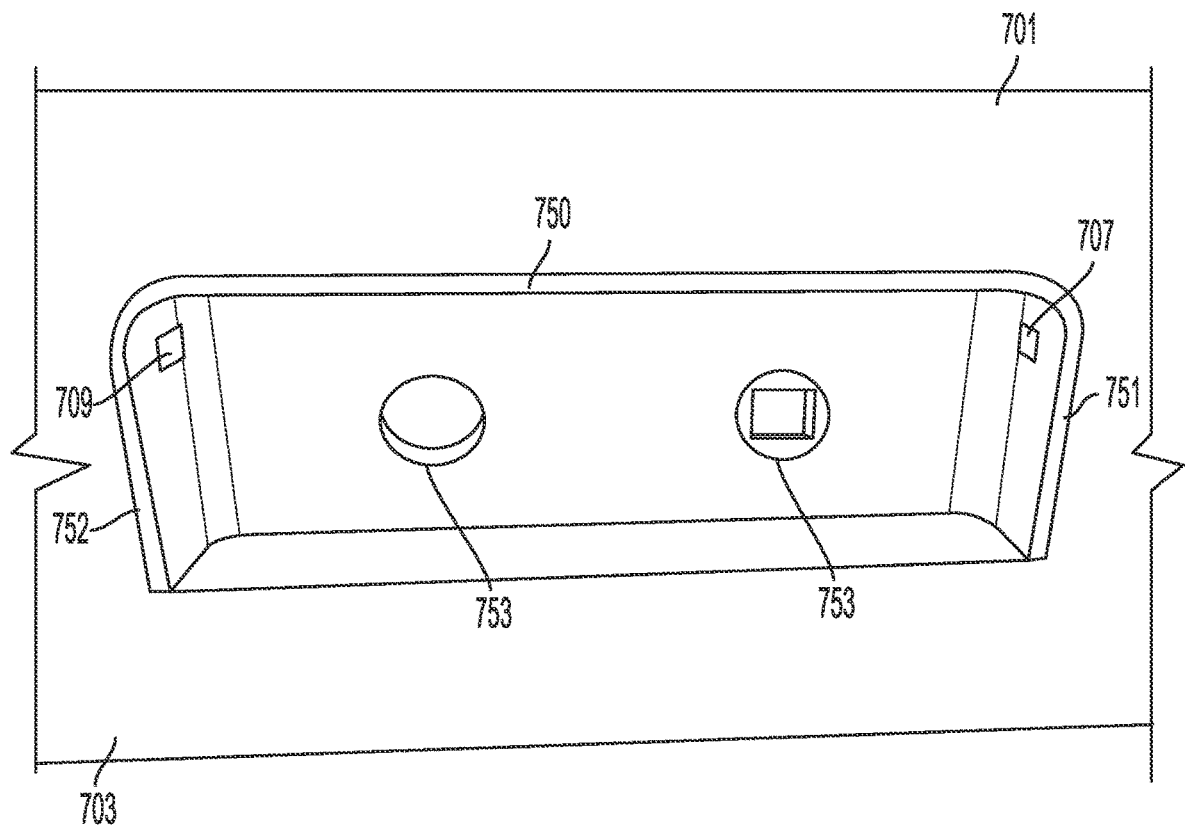
FIG. 8 is a perspective view of an indentation of the playback device of FIG. 7, according to an example implementation.

FIG. 8 shows a close-up, perspective view of the indentation 750 of the playback device 700. In some examples, the indentation 750 may house ports for connecting external cables to the playback device 700. For instance, the indentation 750 may include ports for connecting one or more HDMI cables, optical audio cables, ethernet cables, in addition to AC and/or DC power cables. Two nondescript ports 753 are shown by way of example in FIG. 8, although more or fewer ports 753 are possible.

In some examples, positioning the IR emitters in the indentation 750 may allow for a more efficient mechanical design for the playback device 700, as the internal hardware and wiring required for each of these components, as well as the openings in the housing 701, may all be consolidated at a single location. For instance, the indentation 750 may house all such ports 753 for external connections to the playback device 700, such that the back side 703 of the playback device 700 is exclusive of additional ports.

As shown in FIG. 8, the indentation 750 may include a first wall 751 and an opposing second wall 752, each arranged perpendicular to the back side 703 of the housing 701. The first IR emitter 707 may be positioned in the first wall 751 of the indentation 750, and the second IR emitter 709 may be positioned in the second wall 752. This arrangement may facilitate the positioning of the IR emitters in the orientation generally discussed above.

Figure 9:
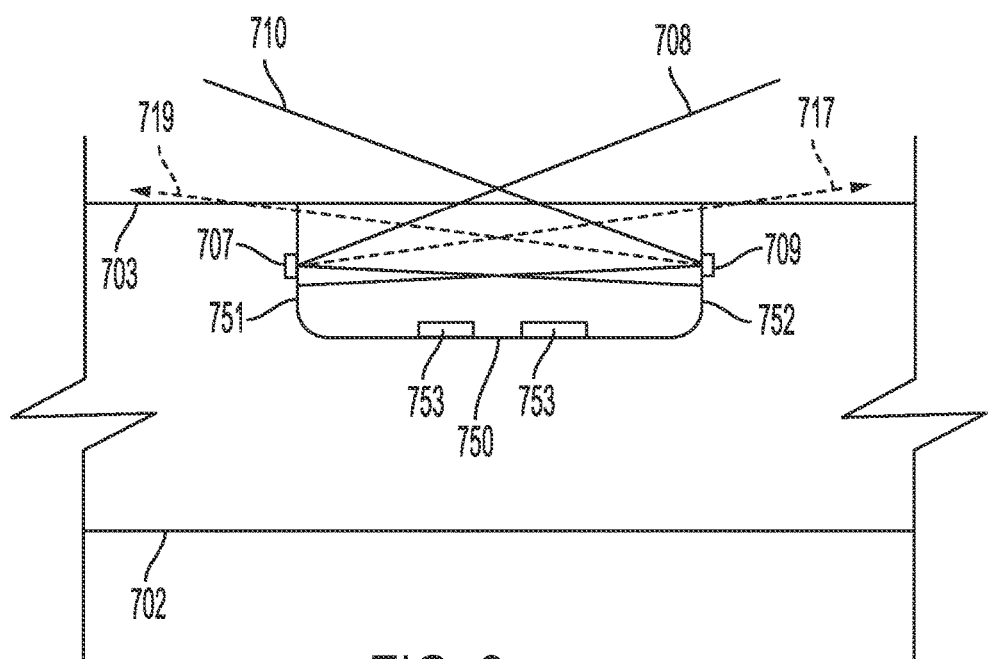
FIG. 9 is a top view of the playback device of FIG. 7, according to an example implementation.

For example, referring now to FIG. 9, the first IR emitter 707 is positioned in the first wall 751 of the indentation 750, and is oriented such that a first IR signal 708 is directed toward the second end 705 of the housing 701. As shown in FIG. 9, the first IR emitter 707 has a focused emitting direction 717 that is arranged at a relatively small angle of incline with respect to the back side 703 of the housing 101. Further, due to the first IR emitter 707 being recessed within the indentation 750, the center of the first IR signal 708, represented by the focused emitting direction 717 shown in a dashed line, is pointed at the second wall 752 of the indentation 750. Nonetheless, approximately half of the first IR signal 708 clears the indentation 750. In some other implementations, the first IR emitter 707 may be positioned elsewhere in the first wall 751 or within the indentation 750.

Similar to the examples discussed above, the second IR emitter 709 shown in FIG. 9 is arranged opposite the first IR emitter 707, within the second wall 752 of the indentation 750. In some implementations, the indentation 750 may be formed from an IR-transparent material, which may facilitate placing the IR emitters within or behind the respective walls within the indentation 750.

In some examples, the IR emitters may be positioned at locations within the indentation 750 that may reduce the likelihood that external cables connected to the at least one port 753 in the indentation 750 will block the emitted IR signals. For instance, the emitters may be positioned such that the first IR emitter 707, the second IR emitter 709, and the at least one port 753 are non-coplanar, in both a horizontal and a vertical direction. As can be seen in FIG. 8, the emitters may be positioned higher within the indentation 750 than the ports 753, allowing the emitted IR signals to pass above any connected cables. Further, and as can be seen in FIG. 9, the IR emitters are offset from the back wall of the indentation 750 that includes the ports 753. Positioning the IR emitters closer to the back side 703 of the housing 701 in this way distances the IR emitters from the connecting ends of the external cables, which are generally bulkier than the cables themselves. Further, as a connected cable exits the indentation 750, it may generally be expected to lie down toward the bottom of the indentation 750. This may provide greater separation from the IR emitters, and further reduce the likelihood of signal blockage by the cable.

In some implementations, the indentation 750 may be located at a midpoint between the first end 704 and the second end 705 of the housing 701. Further, the indentation 750 may be relatively small in relation to the overall length of the playback device 700. For example, a first distance between the first end 704 and the second end 705 of the housing 701 may be greater than one meter, while a second distance between the opposing first and second walls of the indentation 750 may be no greater than 15 centimeters.

In some other implementations, the indentation 750, and the emitters positioned therein, may be offset from the midpoint of the housing 701. In this situation, as discussed above, the emitters and their respective IR signals might not be symmetrically oriented with respect to the back side 703 of the housing 701. Rather, the emitters may be directed at different angles, and/or may be configured with different emitting angles, among other possibilities.

Figure 10:
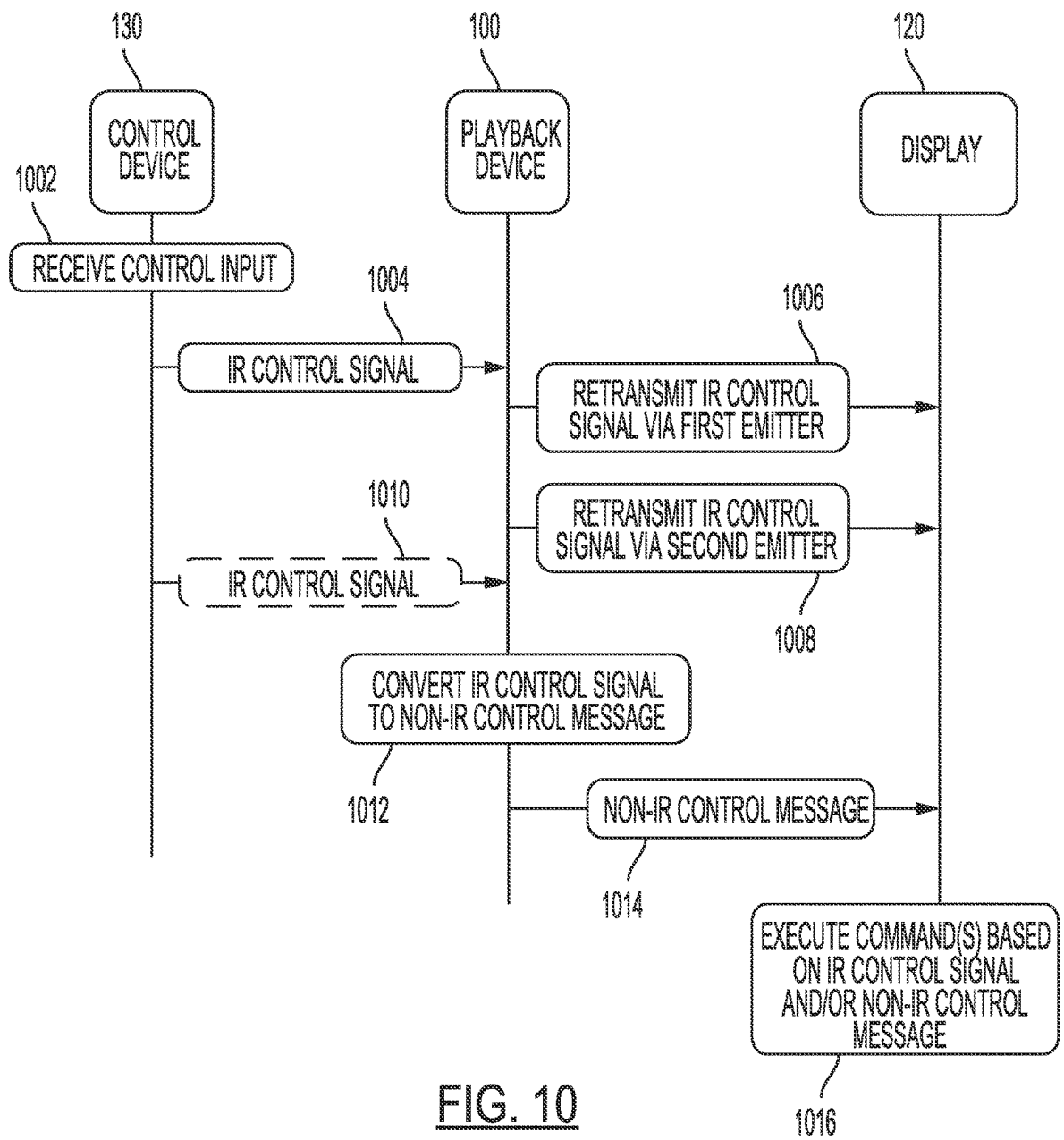
FIG. 10 is a message flow diagram of communications in an entertainment system, according to an example implementation.

FIG. 10 is a message flow diagram illustrating exchanges between computing devices of an entertainment system. For example, the computing devices may be any of the components shown in FIGS. 1-9 and discussed above. The following example implementations will refer to the playback device 100, the display 120, and the control device 130. The playback device 100 may be connected to, and handling audio output for, the display 120, among other components in the entertainment system.

At block 1002, the control device 130 receives a control input. For example, the control input may be a button press by a user on the control device 130, and may represent a given command, such as a volume up or volume down command. At block 1004, the control device 130 transmits a corresponding IR control signal, such as the IR control signal 131 shown in FIG. 1. The IR control signal 131 is then received by the playback device 100. For example, the playback device 100 may receive the IR control signal 131 via the IR receiver 106 shown in the Figures and discussed above.

At block 1006, the playback device 100 retransmits the IR control signal via the first IR emitter 107, which is communicatively coupled to the IR receiver 106 within the housing 101. For example, the first IR emitter 107 may retransmit the received IR control signal 131 as a first IR signal 108. As noted above, the first IR emitter 107 is positioned on the back side 101 of the housing 103 and oriented such that the first IR signal 108 emitted from the first IR emitter 107 is directed toward the second end 105 of the housing 101.

At block 1008, the playback device 100 retransmits the IR control signal via the second IR emitter 109, which is also communicatively coupled to the IR receiver 106 within the housing 101. For example, the second IR emitter 109 may retransmit the received IR control signal 131 as a second IR signal 110. As previously discussed, the second IR emitter 109 is positioned on the back side 103 of the housing 101 and oriented such that the second IR signal 110 emitted from the second IR emitter 109 is directed toward the first end 104 of the housing 101, and also crosses the first IR signal 108 emitted from the first IR emitter 107. The display 120 may then receive one or both of the first IR signal 108 and the second IR signal 110 via its own IR receiver 126.

Blocks 1006 and 1008 may occur substantially concurrently. As a result, if the display 120 receives both the first IR signal 108 and the second IR signal 110 corresponding to a given IR control signal, it may receive them substantially simultaneously, and perceive them as a single signal that is the sum of the first IR signal 108 and the second IR signal 110. Thus, the IR receiver 126 of the display 120 will be unable to distinguish the signals and will process them as a single instruction. This may reduce the likelihood of the display 120 receiving and executing duplicate commands.

In some situations, the original IR control signal 131 might also be received by the display 120. For instance, the control device 130 may be positioned at an angle to the display 120 so that the IR control signal is not blocked by the playback device 100. Or, the playback device 100 may be sized such that the IR receiver 126 is sometimes, but not always, obscured from receiving the IR control signal 131, depending on the location of the control device 130. Thus, there may be situations in which the IR receiver 126 receives both the control signal 131 and one or both of first IR signal 108 and the second IR signal 110.

To account for this possibility, the IR control signal 131 may be received, processed, and retransmitted by the playback device 100 without significant (e.g., noticeable) delay, so that the resulting first IR signal 108 and the second IR signal 110 are substantially indistinguishable not only from each other, but also from the original control signal 131.

For example, the playback device 100 may receive the IR control signal 131 in analog form and manipulate the signal linearly such that it remains in analog form when it is retransmitted as the first IR signal 108 and the second IR signal 110. For instance, the playback device 100 may include circuitry for amplifying the received signal, filtering extraneous IR light that might have been received by the IR receiver 126 (e.g., using a band pass filter), and adding or removing DC offset from the signal. A linear current is provided corresponding to the manipulated signal to drive the LED emitters discussed above.

In the example discussed above, the playback device 100 does not convert the analog signal into a digital form. As a result, the linear manipulation of the analog signal can be performed relatively rapidly so that there is no significant delay in the retransmitted signal. Thus, the display 120 may receive the IR control signal 131 and one or both of the first IR signal 108 and the second IR signal 110 substantially simultaneously. As above, the display 120 may perceive them these substantially simultaneous signals as a single, summed signal and process them as a single instruction. This may further reduce the likelihood of the display 120 receiving and executing duplicate commands.

In some implementations, as shown at block 1010, the control device 130 may transmit a second IR control signal that is received by the playback device 100 via the second IR receiver 116, as discussed above. At block 1012, the playback device 100 may convert the IR control signal received via the second IR receiver 116 into a non-IR control message. The playback device 100 may then, at block 1014, transmit the non-IR control message to a connected computing device, such as the display 120.

As noted above, the second IR control signal received by the playback device 100 via the second IR receiver 116 may differ from the first IR control signal transmitted by the control device at block 1004. However, in some examples, they may be the same IR control signal. For instance, the IR control signal transmitted at block 1004 may be received by both the first IR receiver 106 and the second IR receiver 116, and thus may also be the IR control signal transmitted at block 1010.

At block 1016, the display 120 may execute one or more commands based on the retransmitted IR control signal. For instance, for the volume up or volume down command discussed above, the display 120 may increase or decrease its volume level accordingly, which may be further relayed in a message back to the playback device 100. Additionally or alternatively, the display 120 may execute commands based on the non-IR control message received from the playback device 100. In some examples, the non-IR control message may be relayed to another component connected to the entertainment system, and that connected component may execute commands based on the non-IR control message.

Figure 11:
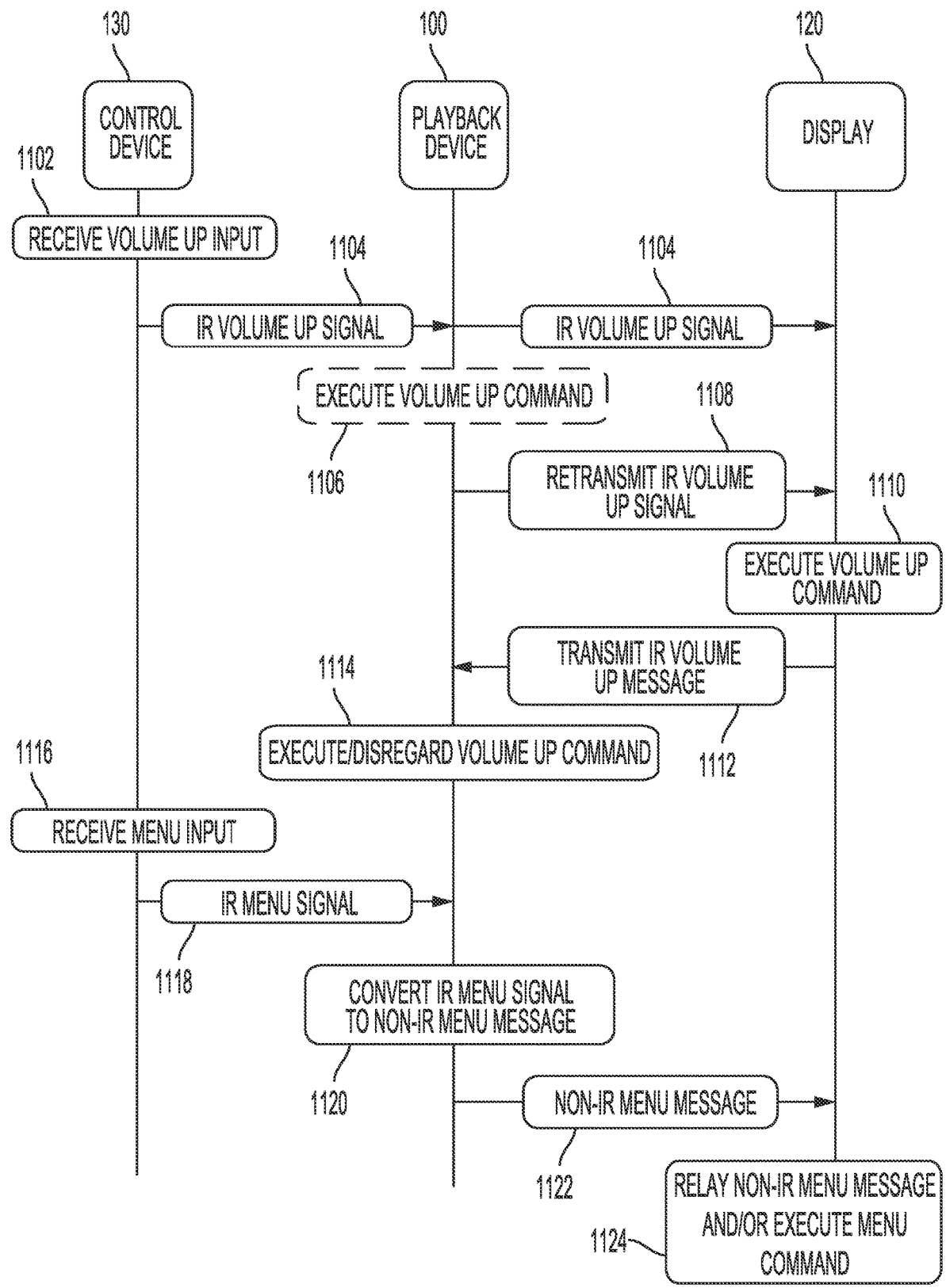
FIG. 11 is another message flow diagram of communications in an entertainment system, according to an example implementation.

FIG. 11 shows another example message flow diagram illustrating exchanges between components of an entertainment system. For instance, at block 1102 the control device 130 may receive a control input that is a volume up input. For example, the volume up input may correspond to a user request to increase the volume of a movie that is being displayed on the display 120, where the corresponding audio for the movie is being played by the playback device 100.

At block 1104, the control device 130 transmits an IR volume up signal that is received by the playback device 100. As discussed above, the display 120 may also receive the IR volume up signal transmitted at block 1104. Skipping optional block 1106 for the moment, the playback device 100 may retransmit the IR volume up signal at block 1008. As noted previously, this may include retransmitting the IR volume up signal via the first and second emitters arranged as shown in the Figure and discussed above.

The display 120 receives the retransmitted IR volume up signal and executes a volume up command at block 1110 that corresponds to the volume up signal. Because the playback device 100 is handling audio output for the movie, the display 120 may handle the execution of the volume up command in various ways. For instance, the display 120 may include its own internal speakers, yet these may be disabled in favor of the display 120. Although the display 120 is not outputting audio content, the display 120 may process the retransmitted IR volume up signal and update a state variable that is stored in its memory, which represents the current volume level of the display 120. The display 120 may also provide a visual indication of the current volume level based on the updated volume level state variable. Further, the display 120 may send the volume up command along with the audio content to the playback device 100 via a digital audio cable, for example. In yet another embodiment, the display 120 may adjust the volume level of the audio content, and then send volume adjusted audio content to the playback device 100 for playback.

Returning to block 1106, in some implementations, the playback device 100 may be equipped to recognize the IR volume up signal as representing a command that will eventually be routed back to the playback device 100. In such cases, the playback device 100 may, at block 1106, execute a volume up command corresponding to the IR volume up signal and adjust the volume of the audio content that it is receiving form the display 120. In this situation, the playback device 100 might not retransmit the IR volume up signal at block 1108.

Alternatively, the playback device 100 may execute the volume up command at block 1106 and nonetheless continue with retransmitting the IR volume up signal at block 1108, which may cause the execution of the volume up command at block 1110 by the display 120 and the transmission of the volume up message at block 1112 back to the playback device 100. Moreover, the display 120 may execute the volume up command at block 1110 and transmit the IR volume up message at block 1112 if the display 120 received the IR volume up signal at block 1104. As discussed above, the display 120 may then provide a visual indication of the current volume level based on an updated volume level state variable according to the IR volume up signal. However, the playback device 100 may be configured to disregard the volume up command at block 1114 if the volume up command was already executed at block 1106. Other examples are also possible.

In another implementation shown in FIG. 11, the control device 130 may receive an input for controlling a computing device that is a component of the entertainment system. For example, a DVR may be connected via an HDMI cable to the display 120, and the control device 130 may receive, at block 1116, a menu input corresponding to a user request to browse (e.g., scroll up, scroll down, make a selection, etc.) within a menu of the DVR. Accordingly, at block 1118, the control device 130 transmits an IR menu signal that is received by the second IR receiver 116 of playback device 100. As noted previously, the IR menu signal transmitted at block 1118 might also be received by the first IR receiver 106 of playback device 100, and might also be retransmitted by the first and second IR emitters 107 and 109. However, because the signal is coded for a different device, the IR menu signal may have no effect on the display 120.

At block 1120, the playback device 100 may convert the IR menu signal into a non-IR menu message. For example, the playback device may process the IR menu signal and convert it into a digital CEC menu message. At block 1122, the playback device 100 may transmit the digital CEC menu message to the display 120.

At block 1124, the display 120 may relay the digital CEC menu message via the HDMI cable to the DVR, and the DVR may execute the corresponding menu command. In some other implementations, where the input received by the control device 130 at block 1116 is intended for the display 120 (e.g., an source change input corresponding to a user request to change the source of the display 120), the display 120 may handle a converted, non-IR source change message as noted above. For instance, the playback device 100 may execute a source change command at block 1124 that corresponds to the source change input, or the playback device 100 may disregard the non-IR source change message if a retransmitted IR signal was already received.

FIG. 10 and FIG. 11 may include one or more operations, functions, or actions as illustrated by one or more of blocks 1002-1016 and blocks 1102-1124. Although the blocks are illustrated in sequential order, some of the blocks may also be performed in parallel, and/or in a different order than those described herein. Also, the various blocks may be combined into fewer blocks, divided into additional blocks, and/or removed based upon the desired implementation.

In addition, for the message flow diagrams in FIG. 10 and FIG. 11 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIG. 10 and FIG. 11 may represent circuitry and/or machinery that is wired or arranged to perform the specific functions in the process.

IV. Conclusion

The above discussions relating to playback devices, controller devices, displays, and other computing devices provide only some examples of operating environments within which the functions and methods described may be implemented. Other operating environments and configurations of entertainment systems, playback devices, and other computing devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, blocks, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A playback device comprising:
   a housing comprising a front side, a back side, a first end, and a second end;
   an IR receiver positioned on the front side of the housing;
   a first IR emitter positioned on the back side of the housing and oriented such that a first IR signal emitted from the first IR emitter is directed toward the second end of the housing;
   a second IR emitter positioned on the back side of the housing and oriented such that a second IR signal emitted from the second IR emitter a) is directed toward the first end of the housing and b) crosses the first IR signal emitted from the first IR emitter; and
   wherein the first IR emitter and the second IR emitter are each communicatively coupled to the IR receiver within the housing such that the first IR emitter and the second IR emitter are configured to retransmit an IR control signal received by the IR receiver.

2. The playback device of claim 1, wherein the first IR emitter and the second IR emitter each comprise a focused emitting direction, wherein the first IR emitter is oriented such that the focused emitting direction of the first IR emitter is substantially parallel to the back side of the housing, and wherein the second IR emitter is oriented such that the focused emitting direction of the second IR emitter is substantially parallel to the back side of the housing.

3. The playback device of claim 2, wherein the focused emitting direction of the first IR emitter comprises an angle of incline of five degrees or less from the back side of the housing, and wherein the focused emitting direction of the second IR emitter comprises an angle of incline of five degrees or less from the back side of the housing.

4. The playback device of claim 3, wherein the first IR emitter and the second IR emitter each comprise an emitting angle of 50 degrees or less.

5. The playback device of claim 1, wherein the back side of the housing comprises an indentation, and wherein the first IR emitter and the second IR emitter are positioned within the indentation.

6. The playback device of claim 5, wherein the indentation is located at a midpoint between the first end and the second end of the housing.

7. The playback device of claim 5, wherein the indentation comprises opposing first and second walls arranged perpendicular to the back side of the housing, wherein the first IR emitter is positioned in the first wall of the indentation, and wherein the second IR emitter is positioned in the second wall of the indentation.

8. The playback device of claim 7, wherein a distance between the opposing first and second walls of the indentation is no greater than 15 centimeters.

9. The playback device of claim 7, wherein the indentation is formed from an IR-transparent material.

10. The playback device of claim 5, wherein the indentation comprises at least one port for connecting an external cable, and wherein the back side of the housing is exclusive of additional ports.

11. The playback device of claim 10, wherein the first IR emitter, the second IR emitter, and the at least one port are non-coplanar.

12. The playback device of claim 1, wherein a distance between the first end and the second end of the housing is greater than one meter.

13. The playback device of claim 1, wherein the IR receiver is a first IR receiver, wherein the IR control signal is a first IR control signal, and wherein the playback device further comprises:
a second IR receiver positioned on the front side of the housing; and
programming for a) converting a second IR control signal received by the second IR receiver to a non-IR control message and b) transmitting the non-IR control message to a computing device connected to the playback device.

14. A method of repeating an IR signal, the method comprising:
receiving, via an IR receiver positioned on a front side of a housing of a playback device, an IR control signal, wherein the housing further comprises a back side, a first end, and a second end;
retransmitting the IR control signal via a first IR emitter communicatively coupled to the IR receiver within the housing, wherein the first IR emitter is positioned on the back side of the housing and oriented such that a first IR signal emitted from the first IR emitter is directed toward the second end of the housing; and
retransmitting the IR control signal via a second IR emitter communicatively coupled to the IR receiver within the housing, wherein the second IR emitter is positioned on the back side of the housing and oriented such that a second IR signal emitted from the second IR emitter a) is directed toward the first end of the housing and b) crosses the first IR signal emitted from the first IR emitter.

15. The method of claim 14, wherein the first IR emitter and the second IR emitter each comprise a focused emitting direction, wherein the first IR emitter is oriented such that retransmitting the IR control signal via the first IR emitter comprises retransmitting the IR control signal in a focused emitting direction that is substantially parallel to the back side of the housing, wherein the second IR emitter is oriented such that retransmitting the IR control signal via the second IR emitter comprises retransmitting the IR control signal in a focused emitting direction that is substantially parallel to the back side of the housing.

16. The method of claim 15, wherein retransmitting the IR control signal comprises retransmitting the IR control signal from the first IR emitter in a focused emitting direction that comprises an angle of incline of five degrees or less from the back side of the housing, and retransmitting the IR control signal from the second IR emitter in a focused emitting direction that comprises an angle of incline of five degrees or less from the back side of the housing.

17. The method of claim 16, wherein retransmitting the IR control signal comprises retransmitting the IR control signal from each of the first IR emitter and the second IR emitter at an emitting angle of 50 degrees or less.

18. The method of claim 14, wherein the back side of the housing comprises an indentation, and wherein the first IR emitter and the second IR emitter are positioned within the indentation such that retransmitting the IR control signal via the first IR emitter and the second IR emitter comprises retransmitting the IR control signal from the indentation.

19. The method of claim 18, wherein the indentation comprises opposing first and second walls arranged perpendicular to the back side of the housing, wherein the first IR emitter is positioned in the first wall of the indentation such that retransmitting the IR control signal via the first IR emitter comprises retransmitting the IR control signal from the first wall of the indentation, and wherein the second IR emitter is positioned in the second wall of the indentation such that retransmitting the IR control signal via the second IR emitter comprises retransmitting the IR control signal from the second wall of the indentation.

20. The method of claim 14, wherein the IR receiver is a first IR receiver, wherein the IR control signal is a first IR control signal, and wherein the playback device further comprises a second IR receiver positioned on the front side of the housing, the method further comprising:
converting a second IR control signal received by the second IR receiver to a non-IR control message; and
transmitting the non-IR control message to a computing device connected to the playback device.

* * * * *